(12) United States Patent
Stöwe et al.

(10) Patent No.: US 6,828,528 B2
(45) Date of Patent: Dec. 7, 2004

(54) ELECTRIC CIRCUIT TO CONTROL AN AIR-CONDITIONED SEAT

(75) Inventors: Stefan Stöwe, Mering (DE); Michael Seifert, Augsburg (DE); Alexander Eilez, München (DE)

(73) Assignee: W.E.T. Automotive Systems AG (DE)

( * ) Notice: Subject to any disclaimer, the term of this patent is extended or adjusted under 35 U.S.C. 154(b) by 0 days.

(21) Appl. No.: 10/198,445

(22) Filed: Jul. 17, 2002

(65) Prior Publication Data

US 2003/0196998 A1 Oct. 23, 2003

(Under 37 CFR 1.47)

(30) Foreign Application Priority Data

Jul. 18, 2001 (DE) .......................................... 101 35 008

(51) Int. Cl.[7] ................................................ H05B 1/02
(52) U.S. Cl. ...................... 219/483; 219/202; 219/507; 165/256; 165/247; 307/39
(58) Field of Search ................................ 219/202, 203, 219/507, 205, 490, 483, 486, 497, 501, 511, 508; 165/256, 247, 123, 244, 270, 223; 62/3.5; 307/39–41

(56) References Cited

U.S. PATENT DOCUMENTS

| | | | | | |
|---|---|---|---|---|---|
| 4,222,435 | A | * | 9/1980 | Kumagai | 165/11.1 |
| 5,171,973 | A | * | 12/1992 | Higgins | 219/457.1 |
| 5,626,021 | A | * | 5/1997 | Karunasiri et al. | 62/3.5 |
| 6,079,485 | A | * | 6/2000 | Esaki et al. | 165/43 |
| 6,397,002 | B1 | * | 5/2002 | Bucher et al. | 392/368 |
| 6,431,268 | B1 | * | 8/2002 | Rudd | 165/223 |

* cited by examiner

Primary Examiner—Mark Paschall

(57) ABSTRACT

A control circuit for a vehicle seat having at least one heating element and at least one fan is provided. The control circuit includes a two-pole switch having two synchronously actuated switch elements. The switch elements are operatively connected to the heating element and the fan to operate the heating element and the fan in a first operating mode wherein only the heating element is active, and a second operating mode wherein both the heating element and the fan are active. When two heating elements are employed, the two heating elements are connected in parallel by the switch elements in the first operating mode and are connected in series by the switch elements in the second operating mode.

18 Claims, 2 Drawing Sheets

ELECTRIC CIRCUIT TO CONTROL AN AIR-CONDITIONED SEAT

TECHNICAL FIELD

The present invention relates to an electric current to control the heating elements and fans of an air-conditioned seat and, in particular, an air-conditioned seat for automobiles.

BACKGROUND OF THE INVENTION

In German Patent Application 101 16 345.2, a process for controlling of an air-conditioned seat was previously proposed in which, to avoid of overcooling the user with fans switched on, the heating element or elements are switched on as well. Thus, a stream of warmed air is directed at the user. The method disclosed therein operates very satisfactorily, but requires a rather elaborate control.

Accordingly, there is a need for a control circuit for an air-conditioned seat where the user is simultaneously exposed to a stream of warmed air having a simplified control structure.

SUMMARY OF THE INVENTION

An object of the invention, then, is to provide a control circuit for an air-conditioned seat where the user is likewise exposed to a stream of warmed air, having a simplified structure.

According to the invention, an electric circuit to control an air-conditioned seat is provided which, makes possible at least two levels of operation. In the first operating mode, only the heating elements are activated. In the second mode of operation, the heating elements and the fans are activated.

A control circuit for a vehicle seat having at least one heating element and at least one fan is provided. The control circuit includes a two-pole switch having two synchronously actuated switch elements. The switch elements are operatively connected to the heating element and the fan to operate the heating element and the fan in a first operating mode wherein only the heating element is active, and a second operating mode wherein both the heating element and the fan are active.

In another aspect of the invention, a control circuit for a vehicle seat having two heating elements and two fans, one of each of the heating elements and the fans being located in respective first and second cushions of the vehicle seat, is provided. The control circuit includes a two-pole switch having two synchronously actuated switch elements. The switch elements are operatively connected to the heating elements and the fans to operate the heating elements and the fans in a first operating mode wherein only the heating elements are active, and a second operating mode wherein both the heating elements and the fans are active. In other aspects of the invention, a first thermostat is arranged proximate at least one of the heating elements for interrupting a flow of current through the heating elements in at least the second mode of operation. A second thermostat is also arranged proximate at least one of the heating elements for interrupting a flow of current through the heating elements in at least the first mode of operation. A regulator is provided which is associated with at least one of the fans to regulate a speed of the fan as a function of an air temperature within the vehicle. A delay is also operatively connected to at least one of the heating elements for delaying the activation of the heating element in the second operating mode.

Preferably, the fans are operated in the second mode at a reduced power as compared to the first mode. In particular, the heating elements are preferably connected in parallel in the first mode of operation and in series in the second mode.

In one aspect of the invention, at a distance from the zones heated by the heating elements, a thermostat is arranged, interrupting the flow of current through the heating elements at least in the second mode of operation. The thermostat is preferably provided in an electrical supply line for the heating elements.

In a further embodiment, at least one of the fans is provided an additional controller for regulating the rotational speed of the fan as a function of the air temperature in the passenger compartment.

In a further embodiment, a timer is provided to delay the switching on of the heating elements in the second operating mode.

Preferred embodiments of the invention are illustrated in the drawings and will be described below. Other advantages and features of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention. In the following, two embodiments of the circuit according to the invention are illustrated with reference to the drawings wherein.

DETAILED DESCRIPTION OF THE INVENTION

While the present invention is described with regard to a control circuit for a heated and air-conditioned vehicle seat, the present invention may be adapted and utilized for other climate controlled seating applications.

In the following description, various operating parameters and components are described for two constructed embodiments. These parameters and components are included as examples and are not meant to be limiting.

Figure 1:
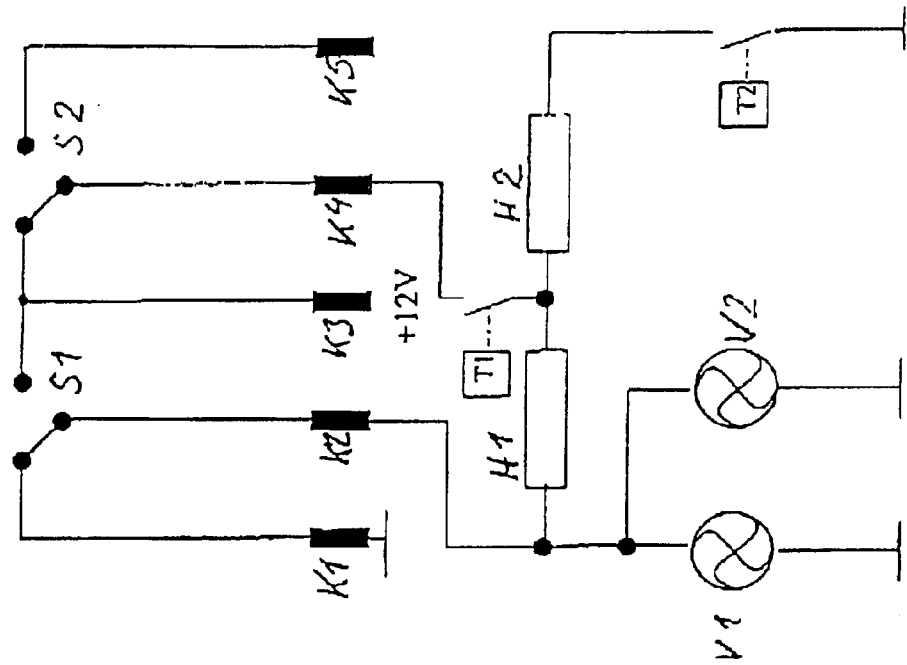
FIG. 1 shows a circuit diagram of a first control circuit according to the invention, with fans switched on full and heating elements connected in series, hence providing moderate heating of the seat.

Referring now to the drawings wherein like reference numerals are used to identify identical components in the various views, FIG. 1 shows a circuit diagram of a first control circuit according to the invention, with fans switched on full and heating elements connected in series, hence providing moderate heating of the seat.

The control element of the circuit according to the invention is a two-pole switch having two synchronously actuated switch levels, whose switch elements S1, S2 can be switched into three operating conditions: "Off," "Fans On, Heat Low," and "Full Heat, Fans Off." The two switch elements S1 and S2 are connected to five terminals K1 to K5. Specifically, a first fixed contact of the circuit element S1 is grounded by way of a terminal K1. The second fixed contact of the circuit element S1 and a first fixed contact of the circuit element S2 are at the supply voltage of 12 V by way of terminal K3. The second fixed contact of the circuit element S2 is on the free terminal K5. The movable contacts of switch elements S1 and S2 are passed to contacts K2 and K4, respectively.

The contact K2 is passed to two heating elements H1 and H2 and by way of a thermostat T2 to ground. Heating element H1 may reside in a seat cushion and heating element H2 may be located in a backrest cushion of a vehicle seat, for example. In parallel with this, fans V1 and V2 are connected in parallel, fanning the seat cushion and the backrest cushion, respectively. Finally, the contact K4 is connected by way of a thermostat T1 to the junction between the two heating elements H1 and H2.

In the position of the circuit elements S1, S2 as shown in FIG. 1, the operating voltage from the terminal K3 passes by way of the circuit element S1 and the terminal K2 to the heating elements H1 and H2 in series and the fans V1 and V2 in parallel. Thus, the fans are switched on full, and the heat is on reduced power.

Figure 2:
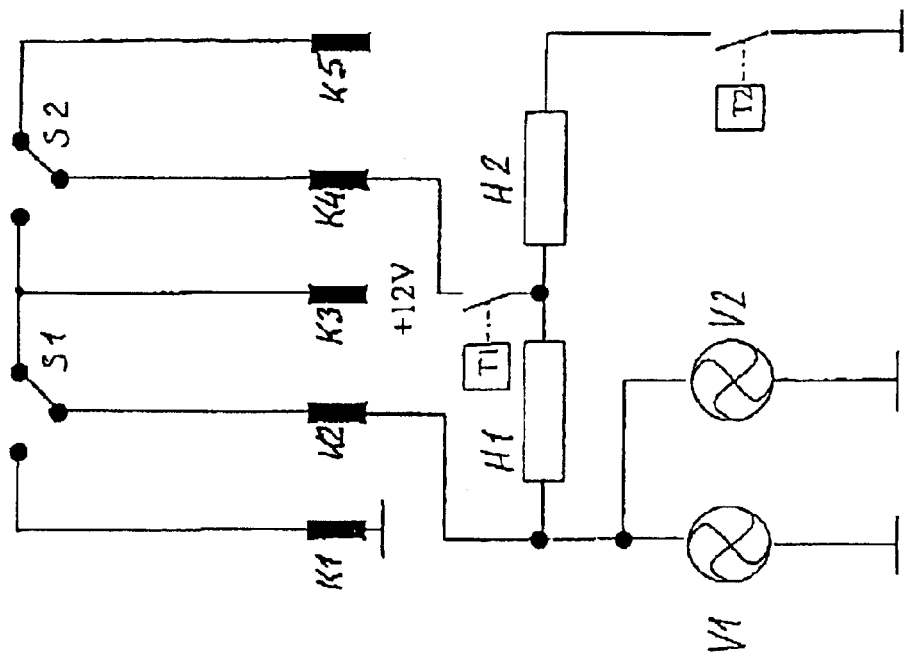
FIG. 2 is the control circuit of FIG. 1 with fans switched off and heat switched on full, i.e. the heating elements connected in parallel.

In the circuit position of FIG. 2, the operating voltage passes from the terminal K3 by way of the circuit element S2 and the terminal K4 to the junction between the two heating elements H1 and H2. These are grounded firstly by way of K2, S1 and K1, and secondly by way of the thermostat T2. Thus, the fans are switched off and the heating is on full power.

The thermostat T1 can function only in parallel operation of the two heating elements H1 and H2. The thermostat T1 remains closed until a temperature of for example 50° C. is reached. Then the circuit is interrupted. Below 30° C., the thermostat T1 switches on again.

The thermostat T2 is switched on in the series current path only for safety. The thermostat T2 switches the series current path off at a temperature of 70° C.

The thermostat T2, in an alternative embodiment, can perform not only the safety function but also that of a regular monitoring of the temperature inside the vehicle. It would then, for example, ensure that the seat heating is switched off at interior temperatures above 35° C.

Figure 3:
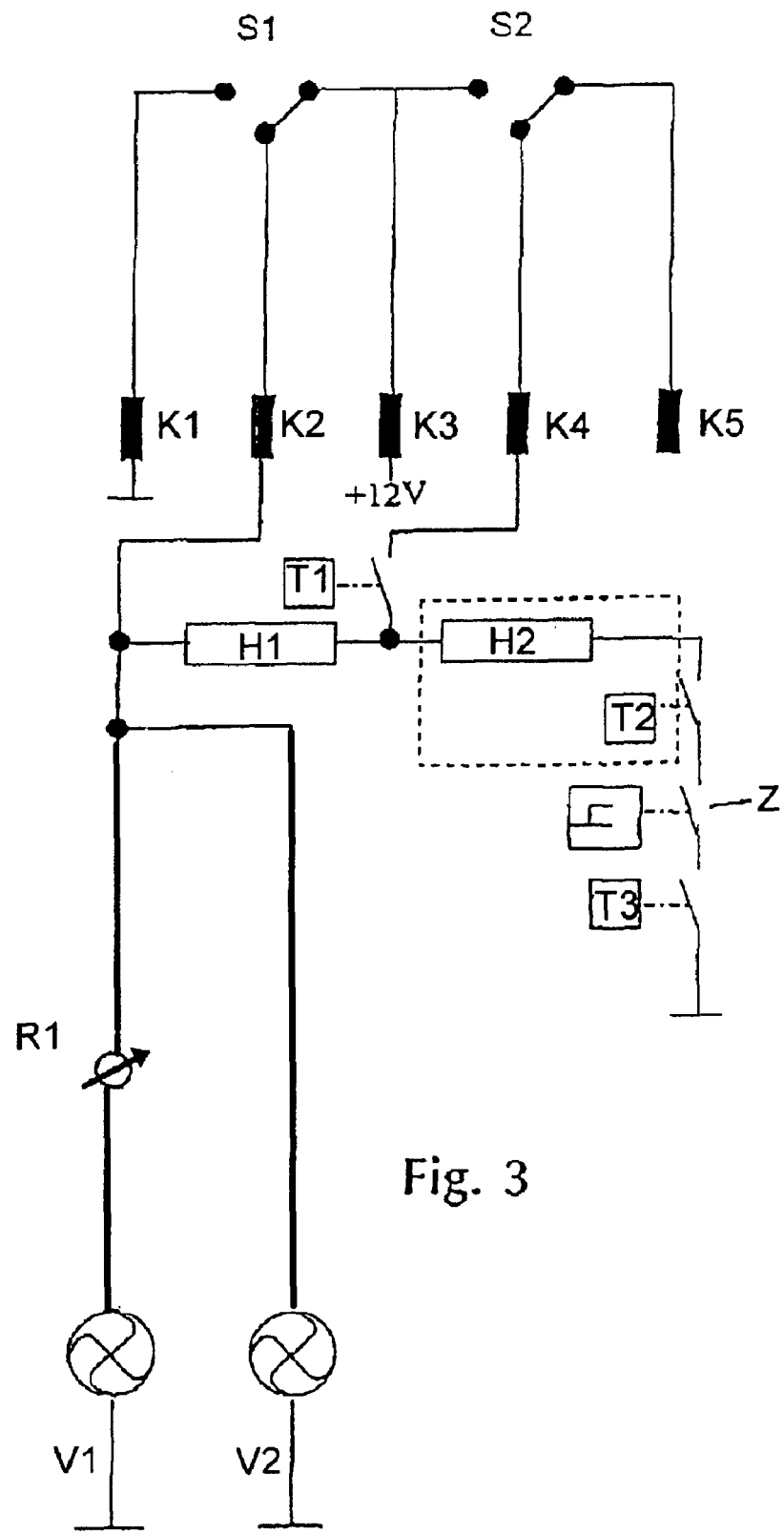
FIG. 3 is a circuit diagram of a second control circuit according to the invention with fans switched on full and heating elements connected in series.

In the embodiment shown in FIG. 3, two thermostats T2 and T3 are connected in series with the series circuit H1, H2, of which T2 takes over the protection against high temperatures and T3 serves to switch off the additional heating in series operation when the ambient temperature is too high. Also, the fan V1 is shown including an additional controller in the form of a regulator R1 for regulating the rotational speed of the fan as a function of the air temperature in the vehicle passenger compartment.

In addition, a timing element Z is connected in series with the heating elements H1, H2, switching the current path on with time delay in series operation exclusively. In parallel operation, the timing element Z remains closed. This ensures an immediate heating of the heating elements H1, H2 in parallel operation. The thermostat T1 is active in this mode only, and regulates the temperature of the two seat-heating elements.

From the foregoing, it can be seen that there has been brought to the art a new and improved control circuit for a heated and ventilated seat. While the invention has been described in connection with one or more embodiments, it should be understood that the invention is not limited to those embodiments. For example, the temperatures at which the various thermostats are activated are merely exemplary of typical temperatures for an automotive seating application. Other temperatures are, of course, contemplated by the present invention as well. Thus, the invention covers all alternatives, modifications, and equivalents as may be included in the spirit and scope of the appended claims.

What is claimed is:

1. A control circuit for a vehicle seat having at least one heating element and at least one fan, said control circuit comprising a two-pole switch having two synchronously actuated switch elements, said switch elements operatively connected to said at least one heating element and said at least one fan to operate said at least one heating element and said at least one fan in a first operating mode wherein only said at least one heating element is active, and a second operating mode wherein both said at least one heating element and said at least one fan are active, and a delay operatively connected to said at least one heating element for delaying the activation of said at least one heating element in said second operating mode.

2. A control circuit according to claim 1 wherein the at least one heating element is operated at a reduced power in said second operating mode as compared to said first operating mode.

3. A control circuit according to claim 1 comprising two heating elements, wherein said two heating elements are connected in parallel by said switch elements in said first operating mode and are connected in series by said switch elements in said second operating mode.

4. A control circuit according to claim 2 comprising two heating elements, wherein said two heating elements are connected in parallel by said switch elements in said first operating mode and are connected in series by said switch elements in said second operating mode.

5. A control circuit according to claim 1 comprising a first thermostat arranged proximate said at least one heating element for interrupting a flow of current through said at least one heating element in at least said second mode of operation.

6. A control circuit according to claim 4 comprising a first thermostat arranged proximate at least one of said two heating elements for interrupting a flow of current through said two heating elements in at least said second mode of operation.

7. A control circuit according to claim 5 wherein the first thermostat is provided on an electric supply line for the at least one heating element.

8. A control circuit according to claim 6 wherein the first thermostat is provided on an electric supply line for the two heating elements.

9. A control circuit according to claim 1 comprising a regulator associated with said at least one fan to regulate a speed of said at least one fan as a function of an air temperature within the vehicle.

10. A control circuit for a vehicle seat having two heating elements and two fans, one of each of said heating elements and fans in respective first and second cushions of said vehicle seat, said control circuit comprising a two-pole switch having two synchronously actuated switch elements, said switch elements operatively connected to said heating elements and said fans to operate said heating elements and said fans in a first operating mode wherein only said heating elements are active, and a second operating mode wherein both said heating elements and said fans are active, and a delay operatively connected to at least one of said heating elements for delaying the activation of said at least one heating element in said second operating mode.

11. A control circuit according to claim 10 wherein the heating elements are operated at a reduced power in said second operating mode as compared to said first operating mode.

12. A control circuit according to claim 10 wherein said two heating elements are connected in parallel by said switch elements in said first operating mode and are connected in series by said switch elements in said second operating mode.

13. A control circuit according to claim 10 comprising a first thermostat arranged proximate at least one of said heating elements for interrupting a flow of current through said heating elements in at least said second mode of operation.

14. A control circuit according to claim 10 comprising a second thermostat arranged proximate at least one of said heating elements for interrupting a flow of current through said heating elements in at least said first mode of operation.

15. A control circuit according to claim 13 comprising a second thermostat arranged proximate at least one of said heating elements for interrupting a flow of current through said heating elements in at least said first mode of operation.

16. A control circuit according to claim 10 comprising a regulator associated with at least one of said fans to regulate a speed of said at least one fan as a function of an air temperature within the vehicle.

17. A control circuit for a vehicle seat having two heating elements and two fans, one of each of said heating elements and fans in respective first and second cushions of said vehicle seat, said control circuit comprising:

a two-pole switch having two synchronously actuated switch elements, said switch elements operatively connected to said heating elements and said fans to operate said heating elements and said fans in a first operating mode wherein only said heating elements are active, and a second operating mode wherein both said heating elements and said fans are active;

a first thermostat arranged proximate at least one of said heating elements for interrupting a flow of current through said heating elements in at least said second mode of operation;

a second thermostat arranged proximate at least one of said heating elements for interrupting a flow of current through said heating elements in at least said first mode of operation;

a regulator associated with at least one of said fans to regulate a speed of said at least one fan as a function of an air temperature within the vehicle; and a delay operatively connected to at least one of said heating elements for delaying the activation of said at least one heating element in said second operating mode.

18. A control circuit according to claim 17 wherein the heating elements are operated at a reduced power in said second operating mode as compared to said first operating mode, and wherein said two healing elements are connected in parallel by said switch elements in said first operating mode and are connected in series by said switch elements in said second operating mode.

* * * * *